(12) United States Patent
Sandberg

(10) Patent No.: US 10,088,144 B1
(45) Date of Patent: Oct. 2, 2018

(54) COOLER WITH TUBING LIGHTING

(71) Applicant: Liddup LLC, Las Vegas, CA (US)

(72) Inventor: Jayson T. Sandberg, Las Vegas, NV (US)

(73) Assignee: Liddup, LLC, Las Vegas, NV (US)

( * ) Notice: Subject to any disclaimer, the term of this patent is extended or adjusted under 35 U.S.C. 154(b) by 123 days.

(21) Appl. No.: 15/218,003

(22) Filed: Jul. 23, 2016

Related U.S. Application Data

(60) Provisional application No. 62/197,054, filed on Jul. 26, 2015.

(51) Int. Cl.

| | |
|---|---|
| *F21V 33/00* | (2006.01) |
| *B65D 81/38* | (2006.01) |
| *F21V 8/00* | (2006.01) |
| *F21V 23/00* | (2015.01) |
| *F21V 23/04* | (2006.01) |
| *F21V 29/70* | (2015.01) |
| *F21Y 115/10* | (2016.01) |
| *F21Y 115/15* | (2016.01) |

(52) U.S. Cl.
CPC ...... *F21V 33/0004* (2013.01); *B65D 81/3813* (2013.01); *F21V 23/003* (2013.01); *F21V 23/04* (2013.01); *F21V 29/70* (2015.01); *G02B 6/0005* (2013.01); *F21Y 2115/10* (2016.08); *F21Y 2115/15* (2016.08)

(58) Field of Classification Search
CPC ...... F21V 33/0004; F21V 23/04; F21V 29/70; F21V 23/003; B65D 81/3813; G02B 6/0005; F21Y 2115/15; F21Y 2115/10
See application file for complete search history.

(56) References Cited

U.S. PATENT DOCUMENTS

| | | |
|---|---|---|
| 5,153,561 A | 10/1992 | Johnson |
| 5,947,032 A | 9/1999 | Meier |
| 6,182,462 B1 | 2/2001 | Bania et al. |
| 6,305,185 B1 | 10/2001 | Sloan |
| 6,519,965 B1 | 2/2003 | Blanchard, Sr. et al. |
| 6,726,341 B2 | 4/2004 | Pashley et al. |
| 6,848,808 B2 | 2/2005 | Guerrieri |
| 6,997,007 B1 | 2/2006 | Wyatt |
| 7,066,628 B2 | 6/2006 | Allen |
| 7,188,491 B2 | 3/2007 | Donald, II et al. |
| 7,722,204 B1 | 5/2010 | Sandberg |
| 7,984,997 B1* | 7/2011 | Sandberg ............ F25D 27/005 362/101 |
| 8,210,702 B1 | 7/2012 | Sandberg |
| 8,511,846 B1 | 8/2013 | Sandberg |
| 2005/0213326 A1 | 9/2005 | Sanford |
| 2006/0193126 A1 | 8/2006 | Kuelbs et al. |
| 2006/0279947 A1* | 12/2006 | Henley, Jr. ............ F25D 27/00 362/154 |
| 2007/0103895 A1 | 5/2007 | Rieselbosch |

(Continued)

*Primary Examiner* — Ali Alavi
(74) *Attorney, Agent, or Firm* — Clause Eight IPS; Michael Catania

(57) ABSTRACT

A cooler comprising a main body, a lid, a lighting mechanism and a control unit is disclosed herein. The lighting mechanism is positioned in the main body. The lighting mechanism comprises a fiber optic tubing and a light source. The tubing extends along substantially all of a circumference of the interior chamber. The light source is attached to the tubing. The control unit is connected to the lighting mechanism.

20 Claims, 7 Drawing Sheets

(56) References Cited

U.S. PATENT DOCUMENTS

| | | | |
|---|---|---|---|
| 2007/0217187 A1* | 9/2007 | Blakely | F25D 27/00 362/154 |
| 2008/0025544 A1 | 1/2008 | Maldonado | |
| 2008/0031483 A1 | 2/2008 | Hill | |
| 2008/0170388 A1 | 7/2008 | Greil | |
| 2009/0049859 A1 | 2/2009 | Moon | |
| 2009/0158770 A1 | 6/2009 | Cohrs et al. | |
| 2010/0242520 A1 | 9/2010 | Weir | |

* cited by examiner

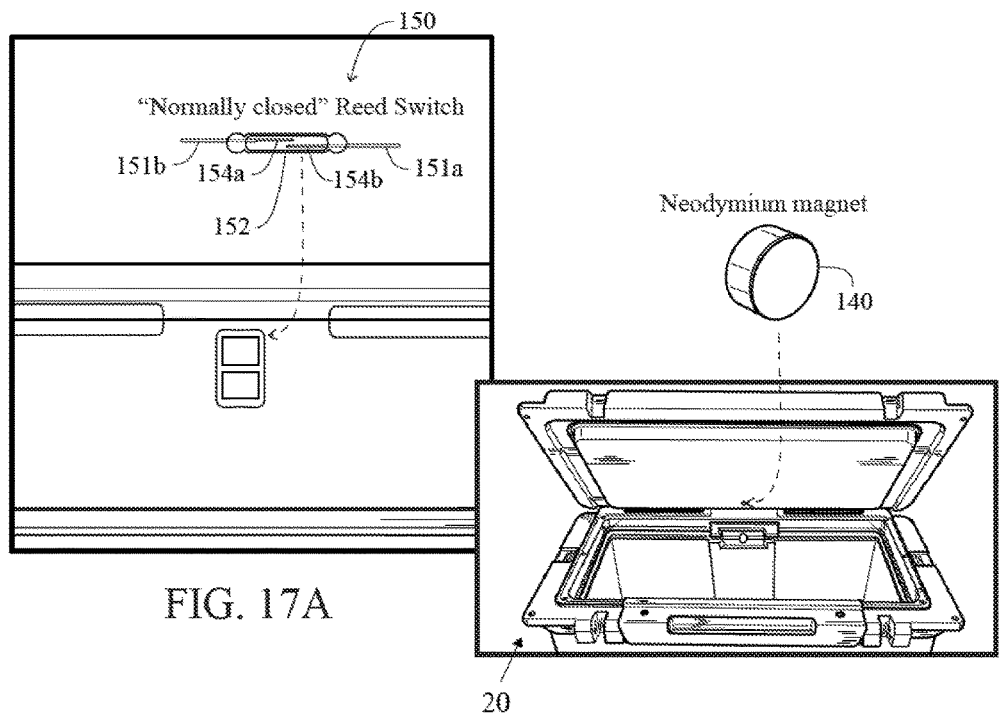
FIG. 17A
FIG. 17B
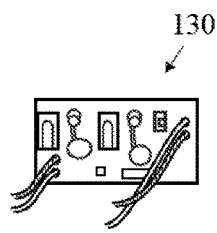
FIG. 18
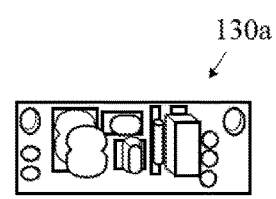
FIG. 19

COOLER WITH TUBING LIGHTING

CROSS REFERENCES TO RELATED APPLICATIONS

The Present Application claims priority to U.S. Provisional Patent Application No. 62/197,054, filed on Jul. 26, 2015, which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to portable beverage coolers.

Description of the Related Art

The prior art discusses various coolers, including coolers with lighting.

Winslow, U.S. Pat. No. 4,754,376 for an Automatic Ice Chest Light discloses a lighting device (light bulb) attached to n interior surface of a lid of an ice chest that is automatically activated when the lid is raised and deactivates when the lid is closed by way of a mercury switch.

Bania, U.S. Pat. No. 6,182,462 for an Internally Illuminated Cooler Box, discloses an incandescent light bulb built into an internal wall of a lid of a cooler box and which is activated by an automatic spring loaded switching mechanism.

Pashley et al., U.S. Pat. No. 6,726,341 for a LED Illumination For Cold Storage Compartments discloses the use of LED lighting for a cold storage compartment.

Blanchard et al., U.S. Pat. No. 6,519,965 for an Externally Illuminated Cooler Box, discloses an incandescent light bulb built into an external side wall of a cooler box and which is activated by a switching mechanism.

Wyatt, U.S. Pat. No. 6,997,007 for a Light Assembly And Cooler System discloses a light assembly positioned on a front wall of a cooler and having an interior illumination panel and an exterior illumination panel which is controlled by a switch that deactivates the lighting when the lid is closed.

Incandescent lights have heat-driven emissions which use an electric current through a filament and produce light along with heat. This light source is completely useless for application to a cooler since it directly takes away from the basic functionality of a cooler. Fluorescent lights use a gas-discharge lamp and electricity to excite mercury vapor, producing a short-wave ultraviolet light that causes a phosphor to fluoresce, in turn producing actual, visible light. This type of light source is cost efficient however requires a ballast to regulate current through a bulb or lamp. Ballasts take up volume and generate heat. Since volume maximization is a primary attribute to be contained, a fluorescent light with a ballast is an improbable solution. Also, fluorescent bulbs are extremely fragile, with the possibility of breakage upon closing of the lid which would expose the hazardous gas and mercury within the cooler.

The prior art, although providing various means for illuminating a cooler, has still not addressed all of the problems with illuminating a portable cooler. The entire interior of the cooler should be illuminated and should be illuminated for an extensive period without an external power source. Also, the illumination should only create a minimal amount of heat in order for the cooler to serve its primary function of cooling the contents of the cooler. The cooler should also have an "automatic" switch to activate the illumination, and the switch should be durable.

BRIEF SUMMARY OF THE INVENTION

The cooler of the present invention resolves the problems associated with prior art coolers by providing a cooler a light mechanism to illuminate the entire interior of the cooler. The light mechanism preferably includes a light source connected to a tubing, preferably a fiber optic tubing.

One aspect of the present invention is a portable cooler comprising a main body, a lid, and a lighting mechanism. The main body has a plurality of walls that define an interior chamber. The lid is attached to the main body. The lid is movable from a closed state to an open state. The lighting mechanism is positioned in the main body. The lighting mechanism comprises a tubing and a light source. The light source is attached to the tubing.

Another aspect of the present invention is a portable cooler comprising a main body, a lid, a lighting mechanism and a power and control unit. The main body has a plurality of walls that define an interior chamber. The lid is attached to the main body. The lid is movable from a closed state to an open state. The lighting mechanism is positioned in the main body. The lighting mechanism comprises a tubing and a light source. The tubing extends along substantially all of a circumference of the interior chamber. The light source is attached to the tubing. The power and control unit is connected to the lighting mechanism. The power and control unit comprises a power source, a circuit and a switch for activation and deactivation of the light source. The switch is in a closed state when the lid of the container is open thereby allowing power to flow from the power source to the light source for automatically illuminating the interior chamber of the container.

Yet another aspect of the present invention is a container comprising a main body, a lid, a lighting mechanism and a power and control unit. The main body has a plurality of walls that define an interior chamber. The lid is attached to the main body. The lid is movable from a closed state to an open state. The lighting mechanism is positioned in the main body. The lighting mechanism comprises a tubing and a light source. The tubing extends along substantially all of a circumference of the interior chamber. The light source is attached to the tubing. The power and control unit is connected to the lighting mechanism. The power and control unit comprises a power source, a circuit and a switch for activation and deactivation of the light source. The switch is in a closed state when the lid of the container is open thereby allowing power to flow from the power source to the light source for automatically illuminating the interior chamber of the container.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 17A is an illustration of a reed switch mechanism for a cooler.

FIG. 17B is an illustration of a magnetic switch mechanism for a cooler.

FIG. 18 is an illustration of a circuit.

FIG. 19 is an illustration of a constant current driver.

DETAILED DESCRIPTION OF THE INVENTION

Figure 1:
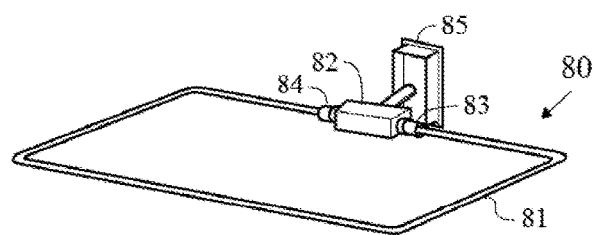
FIG. 1 is an isolated view of a light mechanism of a portable cooler including fiber-optic tubing and a light source.

FIG. 1 illustrates an isolated view of a light mechanism 80 of a portable cooler 20 including fiber-optic tubing 81 and a light source 82. A power and control unit 85 is also shown. Compression connectors 83 and 84 connect the fiber-optic tubing 81 to the light source 82.

Figure 2:
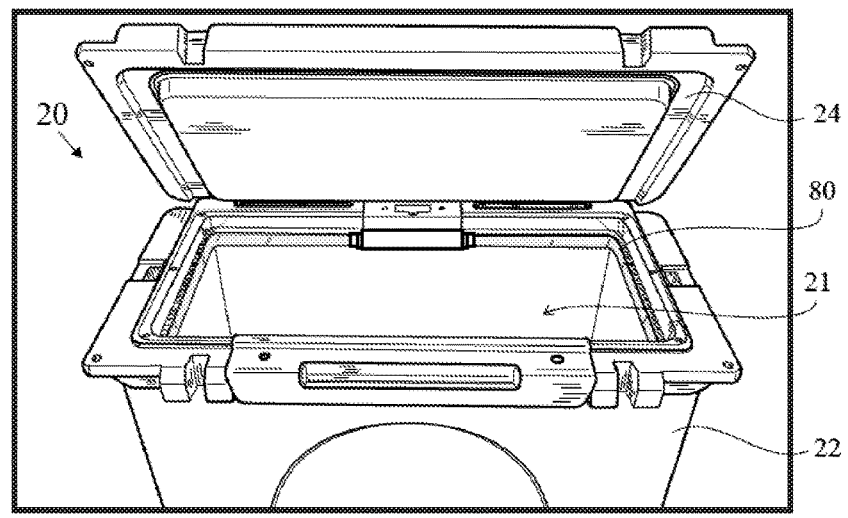
FIG. 2 is a top perspective view of a cooler with a light mechanism including fiber-optic tubing and a light source.
Figure 3:
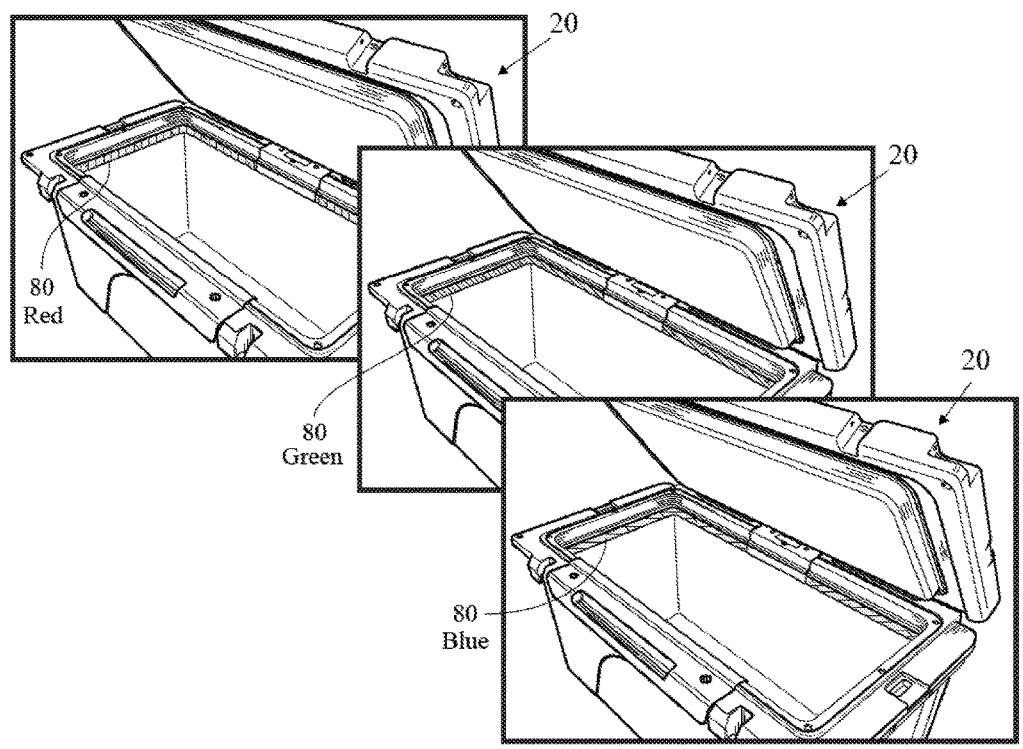
FIG. 3 is a top perspective view of three portable coolers with a light mechanism including fiber-optic tubing and a light source, with each portable cooler having a different color.
Figure 4:
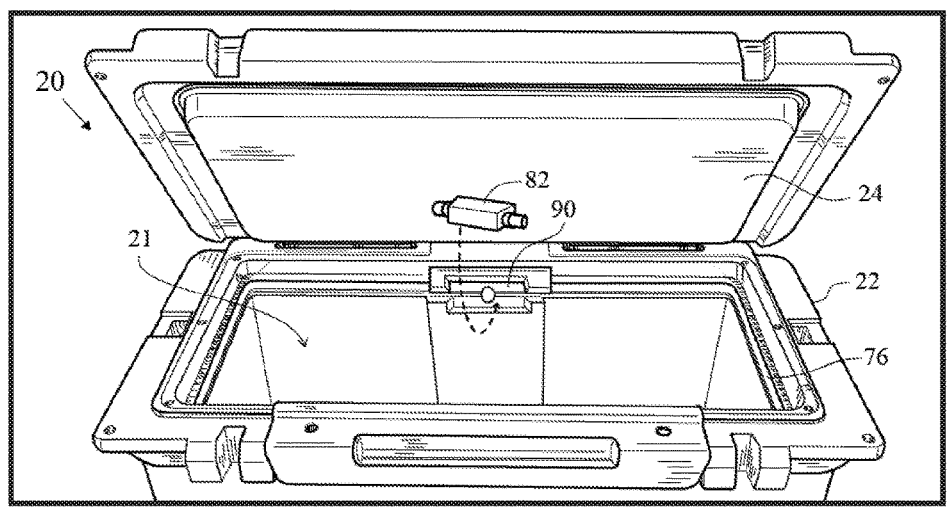
FIG. 4 is a view of a light source positioned within a cooler.

FIGS. 2-4 illustrate a portable cooler 20 comprising a lid 24 and a main body 22 having an interior chamber 21. The lid 24 is preferably made of high density polyethylene (HDPE). The main body 22 comprises an outer liner and an inner liner that defines an interior chamber 21. The lid 24 is attached to the main body 22, and the lid 24 is movable from a closed state to an open state. The light mechanism 80 is positioned along an upper region of the main body 22. In an alternative embodiment, the cooler 20 has a pair of wheels and a drain plug.

The foam of the main body 22 of the cooler 20 preferably weighs approximately 2.6 to 3.0 pounds. The foam of the lid 24 of the cooler roughly weighs between 0.2 to 0.8 pounds. The interior capacity of the cooler 20 is preferably approximately 48 quarts to 50 quarts.

The cooler 20 is further defined by an inner liner and an outer liner of the main body 22. A switch is preferably positioned between the inner liner and outer liner of the main body 22 in a compartment.

Figure 5:
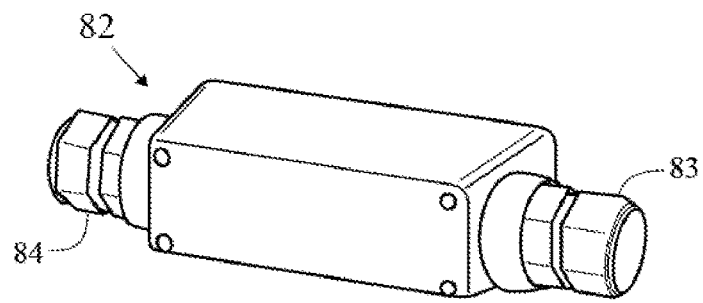
FIG. 5 is an isolated front view of a light source.
Figure 6:
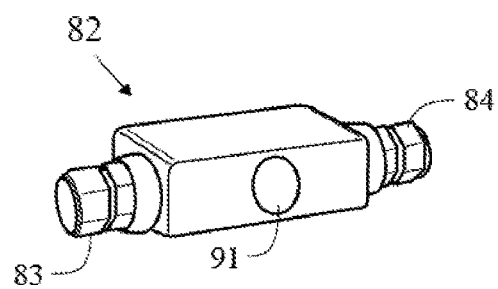
FIG. 6 is an isolated back view of a light source.
Figure 7:
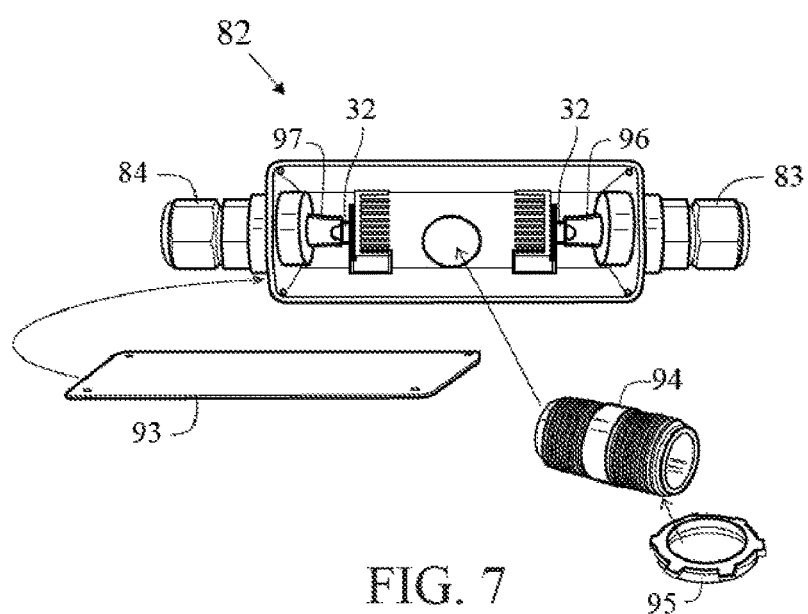
FIG. 7 is an exploded view of interior components of a light source.
Figure 8A:
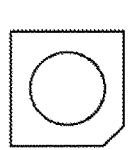
FIG. 8A is a top plan view of an LED used with the light source.
Figure 8B:
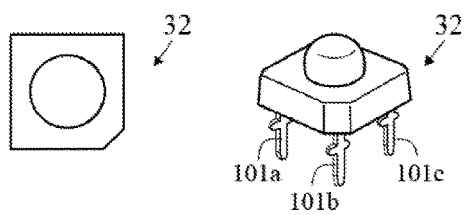
FIG. 8B is a top perspective view of the LED of FIG. 8A.
Figure 8C:
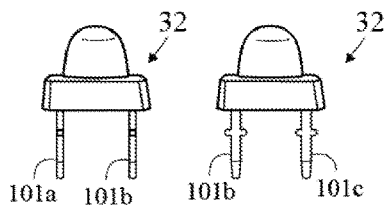
FIG. 8C is a side and front elevation view of the LED of FIG. 8A.
Figure 8D:
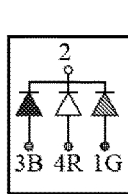
FIG. 8D is a schematic of the circuitry of the LED of FIG. 8A.
Figure 8E:
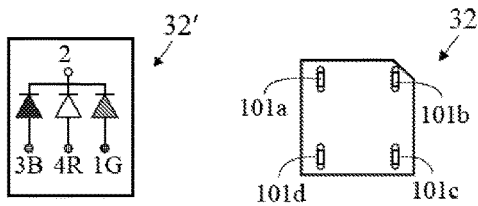
FIG. 8E is a bottom plan view of the LED of FIG. 8A.
Figure 8F:
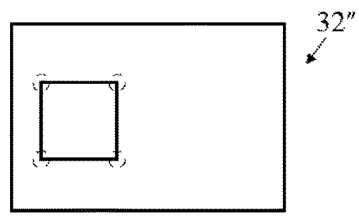
FIG. 8F is a board with recommended mounting holes for the LED.

As shown in FIGS. 5-7, the light mechanism 82 has compression connectors 83 and 84 extending outward from the housing for attachment to the tubing 81. A preferred housing material is ABS plastic. The light source 32 preferably comprises at least one light emitting diode (LED). Preferably a white super bright 5 mm LED. The light mechanism 81 is preferably connected to an upper perimeter of the main body 22. The tubing 81 preferably has a first open end connected to a compression connector 83 (fitting) of the light mechanism 82, and the tubing 81 has a second open end connected to a second compression connector 84 (fitting) of the light mechanism. The light mechanism 82 preferably comprises a housing, a front cover 93, at least one LED 32, preferably two LEDs 32 and a heat sink 105. A hole 91 in the housing allows for a conduit nipple 94 to extend outward. A sealing nut 95 locks the conduit nipple 94 in place within the housing of the light mechanism 82. The conduit nipple 94 connects the light mechanism 82 to the power and control unit 85. Tubing guides 96 and 97 position the tubing 81 over the first light source 32 and the second light source 32. The heat sink 105 is positioned behind the light source 32 to remove heat from the light source 32 and to prevent heating of the cooler 20.

Figure 11:
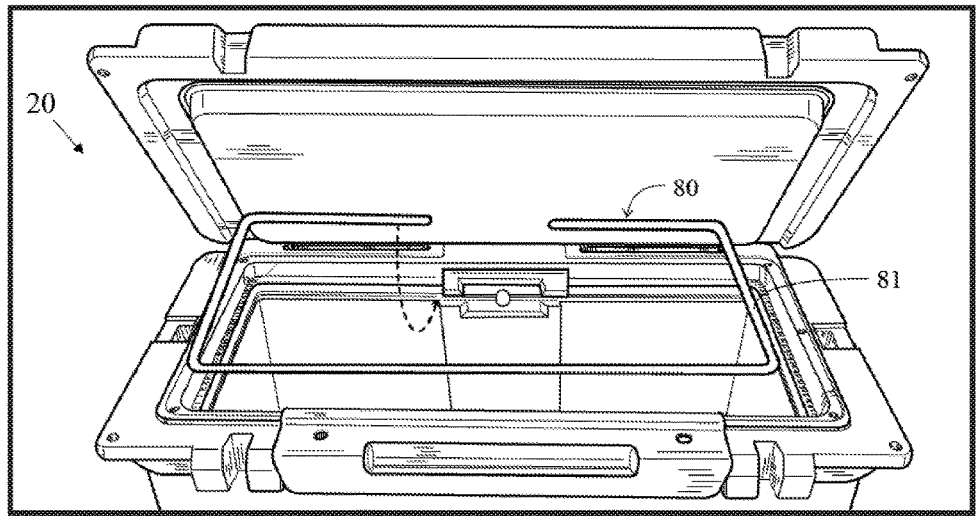
FIG. 11 is an exploded view of a cooler with a light mechanism including fiber-optic tubing and a light source.
Figure 12:
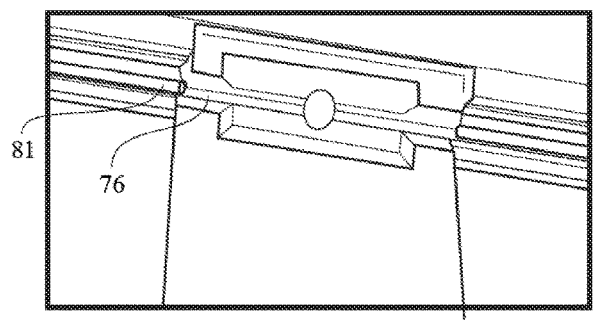
FIG. 12 is an illustration of a mechanism for attachment of the light mechanism to the cooler.

As shown in FIGS. 11 and 12, the tubing 81 preferably has a first section perpendicular to a second section, a third section perpendicular to the second section, a fourth section perpendicular to the third section, and a fifth section perpendicular to the fourth section. The tubing 81 is preferably placed in a groove 76. The tubing 81 is preferably transparent. Alternatively, the tubing 81 is opaque. Alternatively, the tubing 81 is semi-transparent. The tubing 81 preferably has a diameter ranging from 1 mm to 25 mm. In an alternative embodiment, a second end of the tubing 81 has a reflective end cap to achieve a lumen output from the tube. Preferably the reflective end cap is a mirror.

The light source 32 is preferably a LED. As shown in FIGS. 8A-8F, the LED 32 has a common cathode 101a, a blue anode 101b, a red anode 101c and a green anode 101d. The LED 32 can be mounted on a plate 32". The LED 32 preferably has the following minimum requirements: a power dissipation of R 150 mW, B/G 220 mW; a forward current of 80 mA; a peak forward current of R 160 mA, B/G 150 mA; an electrostatic discharge of 1000V; a reverse voltage of 5V; an operating temperature range of −25 to 80° C.; and an storage temperature range of −30 to 80° C. The red color preferably has a minimum luminous intensity of 3000. The blue color preferably has a minimum luminous intensity of 200. The green color preferably has a minimum luminous intensity of 3000. As shown in FIG. 3, the optic tubing 81 of the cooler 20 can emit red, green and blue. Those skilled in the pertinent art will recognize that multiple other colors can be emitted by the tubing 81 without departing from the scope and spirit of the present invention.

The light source 32 is alternatively an organic light-emitting diode (OLED) in which the emissive electroluminescent layer is a film of organic compound which emits light in response to an electric current, and a layer of organic semiconductor is situated between two electrodes, and at least one of these electrodes is transparent.

Alternatively, the light source 32 is a polymer light-emitting diodes (PLED), or light-emitting polymers (LEP), having an electroluminescent conductive polymer that emits light when connected to an external voltage, and is used as a thin film for full-spectrum color displays.

Alternatively, the light source 32 is chemiluminescence with the emission of light (luminescence), as the result of a chemical reaction.

Alternatively, the light source 32 is phosphorescence.

A power and control unit 85 connected to the light mechanism 82. The power and control unit 85 preferably comprises a power source, a circuit and a switch 50 for activation and deactivation of the light source 32.

A switch 50 of the cooler 20 is in a closed state when the lid 24 of the cooler 20 is open thereby allowing power to flow from the power source to the light source for automatically illuminating the interior chamber 21 of the cooler 20. The switch 50 is selected from the group consisting of a magnetic reed switch, a plunger switch, an on/off rocker switch, a lever switch, a ball switch, a Hall Effect sensor switch, a mercury switch, a light dependent resistor switch, and a proximity switch.

In a preferred embodiment, the switch is a magnet reed switch. The liner is preferably made of high density polyethylene (HDPE). Further, a magnet is positioned in the lid 24, wherein a magnetic field of the magnet is in an activating location when the lid 24 is in an open state, wherein the magnetic reed switch completes a circuit from the battery to the light mechanism to illuminate the interior of the chamber 21 of the cooler 20.

The cooler 20 comprises a main body 22 having a plurality of insulated walls that define an interior chamber 21. Each of the plurality of insulated walls has an interior surface that is preferably white in color, which is standard in the cooler industry. The white interior surface serves multiple purposes for the cooler 20, in addition to providing a reflecting amplifier for the light mechanism.

In one embodiment, the switch is a Hall Effect sensor which is positioned between the nine volt battery and the light mechanism. The Hall Effect sensor includes a regulator, a Hall element, an amplifier and a Schmitt trigger. A Hall Effect sensor is a transducer that varies its output voltage in response to changes in a magnetic field. The Hall effect sensor is similar to the magnetic reed switch disclosed above, albeit with no moving components. In response to the lack of a magnetic field, the Hall Effect sensor closes a circuit and activates the light mechanism of the cooler 20 thereby allowing power to flow from the battery to each of the light mechanism for automatically illuminating the interior of the chamber 21 of the cooler 20 when the lid is open and the magnetic field is removed.

The switch 50 is preferably installed between the inside liner and the outside liner 26 of the main body 22 of the cooler 20. Also, the activation by the removal of the magnetic field generated by the magnet in the lid 24 eliminates breakage from wires that must be placed in a lid of a cooler since the magnet is positioned within the lid 24 without the need for wires or other connections.

A plunger switch utilized with a cooler with a light mechanism is another embodiment. The plunger switch breaks (off) or completes (on) a circuit on the common side of the circuit. When the lid 24 of the cooler 20 is in the closed position the plunger is pressed, breaking the circuit on the common side of the circuit, turning the light mechanism off (open circuit). When the lid 24 of the cooler 20 is open the plunger is released, completing the circuit on the common side turning the light mechanism on (closed circuit).

A rocker switch utilized with a cooler with a light mechanism is another embodiment. An on/off rocker switch is positioned on the main body 22 and the on/off rocker switch completes a circuit from the battery to the light mechanism thereby allowing the light mechanism to illuminate an exterior area to the cooler 20. The rocker switch breaks (off) or completes (on) a circuit on the common side of the circuit. Activation of the rocker switch requires the switch be manually or physically rocked into the on or off position. When the lid 24 of the cooler 20 is open the switch would be switched to the on position, completing the circuit and activating the light mechanism (closed circuit). When the cooler lid 24 is shut the switch would then need to be turned into the off position, breaking the circuit and deactivating the light mechanism (open circuit).

A lever switch is another switch. The lever switch breaks (off) or completes (on) a circuit on the common side of the circuit. When the lid 24 of the cooler 20 is in the closed position the lever is pressed, breaking the circuit on the common side of the circuit, turning the light mechanism off (open circuit). When the lid 24 of the cooler 20 is open the lever is released, completing the circuit on the common side turning the light mechanism on (closed circuit).

A ball switch is another switch. The ball switch breaks (off) or completes (on) a circuit on the common side of the circuit. When the lid 24 of the cooler 20 is in the closed position the ball rolls away from the common leads inside of the switch breaking the circuit, turning the light mechanism off (open circuit). When the lid 24 of the cooler 20 is open, the ball rolls towards the common leads completing the circuit or turning the light mechanism on (closed circuit).

A light dependent resistor switch is another switch. The light dependent resistor switch is a small semiconductor. Similar to the photo diode switch discussed below, in low to no ambient light situations, the light dependent resistor switch completes the circuit so the light mechanism will illuminate.

A proximity switch is another switch. A proximity switch is a switch that is activated by either an infrared beam or magnetic field, to power the light mechanism on or off.

A photo diode switch is another switch. The photo diode switch 56 acts as a switch to break (off) or complete (on) a circuit depending on the amount of ambient light present. When the cooler 20 is being used in the day time the need for the interior of the cooler 20 to be illuminated is negated because of ambient light. The photo diode will have a high resistance in the presence of ambient light and break (off) the circuit. When the ambient light is low to none (adjusted with potentiometer) the resistance value drops through the photo diode, completing the circuit (on).

The cooler and light mechanism having tubing, preferably fiber optic tubing, may also be utilized with the invention of Sandberg, U.S. Pat. No. 7,722,204 for a Cooler, which is hereby incorporated by reference in its entirety. The cooler and light mechanism having tubing, preferably fiber optic tubing, may also be utilized with the invention of Sandberg, U.S. Pat. No. 8,210,702 for a Cooler With LED Lighting, which is hereby incorporated by reference in its entirety. The cooler and light mechanism having tubing, preferably fiber optic tubing, may also be utilized with the invention of Sandberg, U.S. patent application Ser. No. 13/794,830, filed on Mar. 12, 2013, for a Cooler With LED Lighting, which is hereby incorporated by reference in its entirety. The cooler and light mechanism having a light source a tubing, preferably fiber optic tubing, may also be utilized with the invention of Sandberg, U.S. patent application Ser. No. 13/794,838, filed on Mar. 12, 2013, for a Cooler With LED Lighting, which is hereby incorporated by reference in its entirety. The cooler and light mechanism having tubing, preferably fiber optic tubing, may also be utilized with the invention of Sandberg et al., U.S. patent application Ser. No. 14/020,868, filed on Sep. 8, 2013, for a Cooler With Modular Lighting, which is hereby incorporated by reference in its entirety. The cooler and light mechanism having tubing, preferably fiber optic tubing, may also be utilized with the invention of Sandberg, U.S. patent application Ser. No. 14/686,780, filed on Apr. 15, 2015, for a Cooler With Secondary Lid, which is hereby incorporated by reference in its entirety. The cooler and light mechanism having tubing, preferably fiber optic tubing, may also be utilized with the invention of Sandberg et al., U.S. Provisional Patent Application No. 62/148,178, filed on Apr. 16, 2015, for a Cooler With SMD LEDs, which is hereby incorporated by reference in its entirety.

Figure 9:
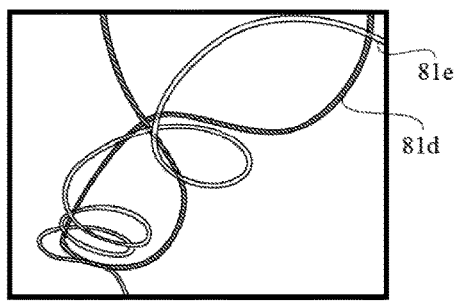
FIG. 9 is an illustration of fiber optic tubing.
Figure 10:
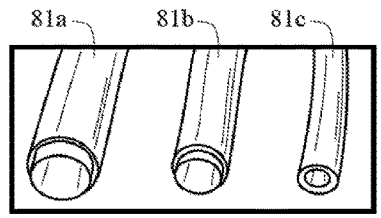
FIG. 10 is an illustration of three different sizes of fiber optic tubing.

As shown in FIGS. 9 and 10, the fiber-optic tubing 81 preferably features side glow solid core fiber optics technology. This fiber optical tubing 81 produces a vibrant uniform glowing tube within the cooler 20. This flexible and durable material provides a cost effective solution without any risk of safety hazards for the cooler 20, or the conventional use of the cooler 20 by consumers. The fiber-optic tubing 81 is preferably a 7 mm solid core tube (full length 80 meters) that is clear in a natural state and emits any color light that is projected from the end points of the fiber-optic tubing 81. Having multiple color options allows for new and innovative marketing platforms for the final product by surpassing the recreational use and entering into some very important functional applications. Covering nearly 360°, the fiber-optic tubing 81 provides a cooler that consumers enjoy.

As shown in FIGS. 5-7, the housing of the light source 82 provides a moisture free environment for the lighting the fiber-optic tubing 81. The fiber-optic tubing 81 is connected, left and right, by the compression fittings 83 and 84. A gasket lined front cover 93 provides the entry access point and is attached with multiple head screws. On the back of the cover 93, a neoprene gasket preferably spans the entire surface. A tight seal is formed as the cover 93 is mounted into the recessed cavity, preferably by way of the ⅜" conduit nipple 94 and sealing nut 95.

The housing of the lighting mechanism 82 preferably contains two 5 mm red green blue (RGB) LEDs 32 (the properties are set forth in Table One), two heat sinks 105, tubing guides 96 and 97, and tubing compression connectors 83 and 84.

TABLE ONE

| Material | Emitted color | Intensity type mcd | Lens color |
|---|---|---|---|
| AlGaInP/GaAs | Red | 4000 | Water clear |
| GaN/SiC | Blue | 400 | Water clear |
| GaN/SiC | Green | 5000 | Water clear |

Figure 13:
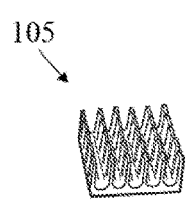
FIG. 13 is an illustration of a heat sink.

The heat sink 105, shown in isolation in FIG. 13, (if necessary) should be directly related to the specific LED manufacturer specifications and format revisions should comply and be appropriate for proper heat dissipation in order to maximize lamp efficiency. Thermal Resistance (2° C./W, 5° C./W, 13.4° C./W), by material (Aluminum, Aluminum Black Anodized, Matte Tin), by mounting style (Adhesive, bolt-on, omni-directional) and dimensions are some of the factors.

Figure 14:
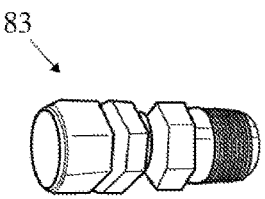
FIG. 14 is an illustration of a compression connector.

The compression connectors 83, shown in isolation in FIG. 14, provides a moisture tight seal connecting the side glow tube to the housing of the light mechanism 82.

Figure 15:
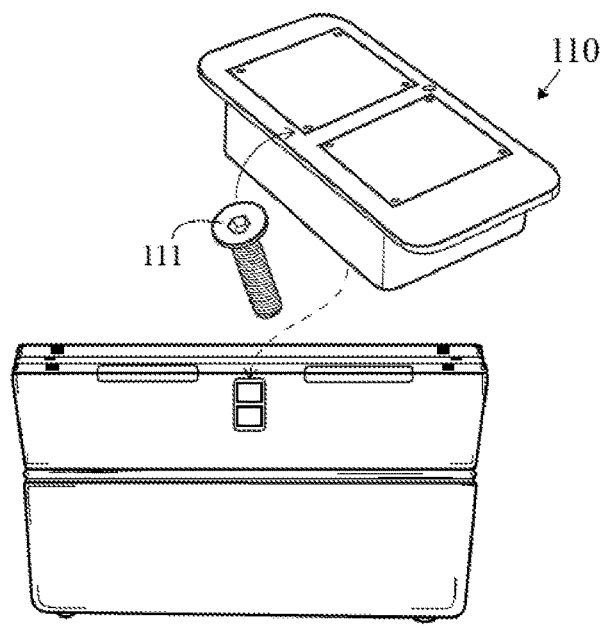
FIG. 15 is an exploded view of a power control mechanism and a cooler.
Figure 16A:
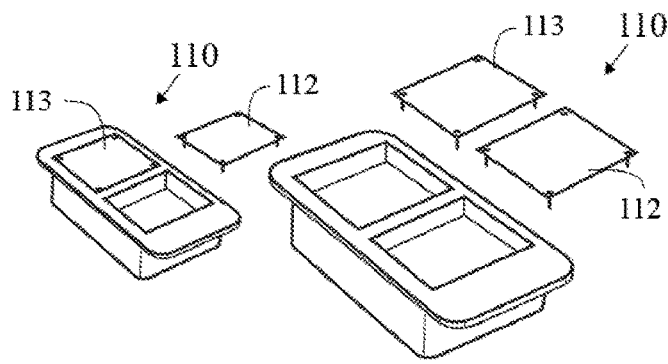
FIG. 16A is an isolated exploded view of components of a power control mechanism.
Figure 16B:
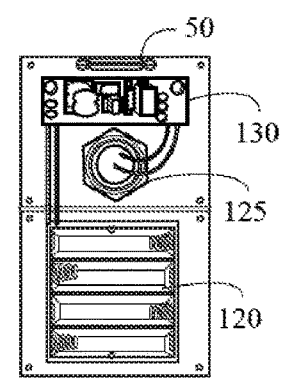
FIG. 16B is a top plan view of the internal components of the power and control unit.

As shown in FIGS. 15, 16A and 16B, the power and control unit 85 preferably contains a circuit board 130 a switch 50 (a magnetic reed switch in this embodiment) and a battery holder (preferably for four AA) 120. A connection point 125 connects to the nipple conduit 94 of the light mechanism 82.

As shown in FIG. 15, the power and control unit 85 is preferably located on the back of the cooler 20. As shown in FIG. 16A, the housing 110 for the power and control unit 85 preferably features dual compartments in order to separate the circuit board 130 from the battery holder 120. A neoprene gasket lines the back of the battery cover 112 and the circuit board cover 113 to keep moisture out of the housing 110. Screws 111 seal the covers for the housing 110.

A reed mechanism 150 of a magnetic reed switch is shown in FIG. 17A. It is shown in the closed state for the lid, which has the circuit open preventing power from flowing from the batteries (or power source) to the light source 32. The switch 150 comprises reed blades 151a and 151b, a glass capsule 152, and contact plates 154a and 154b that overlap to form a contact gap. The glass capsule 152 contains an inert gas.

As shown FIG. 17B, the neodymium magnet 140 for the reed mechanism 150 is easily located and concealed inside the "foam hole plug" of the lid 24 which is located on the bottom center of the inside lid 24. When the lid 24 is open, the contact plates 154a and 154b contact each other thereby closing the circuit to allow power from the batteries to the light source 32 to illuminate the internal chamber 21 of the cooler 20.

As shown in FIG. 18, the printed circuit board (PCB) 130 is preferably the designated location for all resistors, diodes, time out off electronics (optional), all RGB color changing and sensory sound reactive components (optional). The composition of the PCB 130 will vary based upon the LED manufacturer's specifications along with the optional item inclusion.

The preferred power supply specification requires the light mechanism 82 to be driven by four AA batteries. All calculations on maximizing LED lumens in addition to power consumption and battery life expectations should be based on the power source.

In cases where a manufacturer of LEDs does not include an internal "constant-current" driver, an external LED driver 130a or power supply that provides a "constant-current" will be required, as shown in FIG. 19.

In general, solid core fiber optic lighting offers the following advantages: more light is transmitted (within equivalent areas); better color rendering—more blue light stays in the fiber for longer distances, making the light output look "whiter" and/or "brighter"; approximate the look of neon without the cost; higher temperature resistance than PMMA (Plastic acrylic) fiber (100C vs 70C); and reduced transmission of IR energy—less heat is transferred (no filters required).

As shown in FIG. 10, the fiber optic tubing is available in multiple dimensions including larger tubing 81a, 7 mm tubing 81b and small tubing 81c. The tubing diameter preferably ranges from 1 mm to 25 mm. The material composition is preferably PMMA. It is preferably UV Sensitive, requires UV protection for outdoor use, food grade application. The bend radius is preferably eight times the diameter. A fire rating is preferable ANSI/UL 94-VO, it is resistant to most chemicals, e.g., fungi/algae resistant. The operating temperatures are preferably 40° to 100° C. An acceptance angle is preferably 80°. An output angle is preferably 40° half angle. An attenuation is preferably 0.24 dB/ft [0.8 dB/m]. An average life is preferably fifteen years.

A spectral transmission range is preferably 380-750 nm [Visible spectrum]. A numerical aperture is preferably 0.65.

Although the actual method of attachment is an integration piece that will be best determined by the roto mold manufacturer, creating a groove in the mold where the tubing 81 will push into place as a pressure fit mount, is an alternative attachment mechanism. Preferably, there is 8 mm concave groove 76 (as shown in FIG. 12) to encompass 184° of the 360° for a snap tight pressure fit.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim:

1. A cooler comprising:
a main body having a plurality of walls that define an interior chamber;
a lid attached to the main body, the lid movable from a closed state to an open state;
a lighting mechanism positioned in the main body, the lighting mechanism comprising a tubing and a light source, the light source attached to the tubing;
wherein a light generated by the light source is directed through the tubing for illuminating the interior chamber of the main body.

2. The cooler according to claim 1 wherein the light source comprises at least one LED.

3. The cooler according to claim 1 wherein the tubing has a first open end connected to a fitting of the light source, and the tubing has a second open end connected to a second fitting of the light source.

4. The cooler according to claim 1 wherein the tubing has a first section perpendicular to a second section, a third section perpendicular to the second section, a fourth section perpendicular to the third section, and a fifth section perpendicular to the fourth section.

5. The cooler according to claim 1 further comprising a power and control unit connected to the light source.

6. The cooler according to claim 5 wherein the power and control unit comprises a power source, a circuit and a switch for activation and deactivation of the light source.

7. A cooler comprising:
a main body having a plurality of walls that define an interior chamber;
a lid attached to the main body, the lid movable from a closed state to an open state;
a lighting mechanism positioned in the main body, the lighting mechanism comprising a tubing and a light source;
a power and control unit connected to the lighting mechanism, the power and control unit comprising a power source, a circuit and a switch for activation and deactivation of the light source;
wherein the switch is in a closed state when the lid of the cooler is open thereby allowing power to flow from the power source to the light source for automatically illuminating the interior chamber of the cooler.

8. The cooler according to claim 7 wherein the switch is selected from the group consisting of a magnetic reed switch, a plunger switch, an on/off rocker switch, a lever switch, a ball switch, a Hall Effect sensor switch, a mercury switch, a light dependent resistor switch, and a proximity switch.

9. The cooler according to claim 7 wherein the tubing has a first open end connected to a fitting of the light source, and the tubing has a second open end connected to a second fitting of the light source.

10. The cooler according to claim 7 wherein the tubing has a first section perpendicular to a second section, a third section perpendicular to the second section, a fourth section perpendicular to the third section, and a fifth section perpendicular to the fourth section.

11. The cooler according to claim 7 wherein the tubing is transparent.

12. The cooler according to claim 7 wherein the light source comprises a housing, a front cover, at least one LED and a heat sink.

13. The cooler according to claim 7 wherein the light source is an organic light-emitting diode (OLED) in which the emissive electroluminescent layer is a film of organic compound which emits light in response to an electric current, and a layer of organic semiconductor is situated between two electrodes, and at least one of these electrodes is transparent.

14. The cooler according to claim 7 wherein the light source is a polymer light-emitting diodes (PLED), or light-emitting polymers (LEP), having an electroluminescent conductive polymer that emits light when connected to an external voltage, and is used as a thin film for full-spectrum color displays.

15. The cooler according to claim 7 wherein the light source is chemiluminescence with the emission of light (luminescence), as the result of a chemical reaction or the light source is phosphorescence.

16. The cooler according to claim 7 wherein a second end of the tubing has a reflective end cap to achieve a lumen output from the tube.

17. The cooler according to claim 7 wherein the tubing is opaque.

18. The cooler according to claim 7 wherein the tubing is hollow.

19. The cooler according to claim 7 wherein the tubing has a solid core.

20. A container comprising:
a main body having a plurality of walls that define an interior chamber;
a lid attached to the main body, the lid movable from a closed state to an open state;
a lighting mechanism positioned in the main body, the lighting mechanism comprising a tubing and a light source, the tubing extending along substantially all of a circumference of the interior chamber, the light source attached to the tubing;
a power and control unit connected to the lighting mechanism, the power and control unit comprising a power source, a circuit and a switch for activation and deactivation of the light source;
wherein the switch is in a closed state when the lid of the container is open thereby allowing power to flow from the power source to the light source for automatically illuminating the interior chamber of the container.

* * * * *